United States Patent [19]

Ban et al.

[11] 4,039,446
[45] Aug. 2, 1977

[54] HEAVY METAL-BINDING AGENT PROCESS

[75] Inventors: Kouichi Ban; Yasumiti Namba; Yukihiro Sekine; Masaaki Matsuda, all of Niihama, Japan

[73] Assignee: Sumitomo Chemical Company, Limited, Osaka, Japan

[21] Appl. No.: 546,446

[22] Filed: Feb. 3, 1975

Related U.S. Application Data

[62] Division of Ser. No. 373,419, June 25, 1973, abandoned.

[30] Foreign Application Priority Data

June 28, 1972 Japan .................................. 47-65207

[51] Int. Cl.$^2$ ............................................. B01D 15/00
[52] U.S. Cl. ....................................... 210/38 B; 55/72
[58] Field of Search ............. 210/24, 38 B; 260/22 R, 260/79.5 NV; 55/72, 74; 75/101 BE; 423/24, 54, 87, 89, 100, 139

[56] References Cited

U.S. PATENT DOCUMENTS

| | | | |
|---|---|---|---|
| 3,340,326 | 9/1967 | Faessinger et al. | 260/857 G |
| 3,755,161 | 8/1973 | Yokota et al. | 210/38 B |
| 3,847,841 | 11/1974 | Motani et al. | 210/24 |
| 3,884,846 | 5/1975 | Otsuki et al. | 260/2.2 R |
| 3,892,688 | 7/1975 | Motani et al. | 210/24 |
| 3,892,689 | 7/1975 | Motani et al. | 210/24 |

OTHER PUBLICATIONS

Chemical Abstracts, vol. 75, No. 20, Nov. 1971, No. 118633k.
Chemical Abstracts, vol. 72, No. 22, June 1970, No. 112018e.

*Primary Examiner*—Thomas G. Wyse
*Assistant Examiner*—Ivars Cintins
*Attorney, Agent, or Firm*—Stevens, Davis, Miller & Mosher

[57] ABSTRACT

A novel heavy metal-binding agent is obtained by reacting a resin containing in its molecular chain —NH—, —NH$_2$, or both thereof with carbon disulfide and, if necessary, treating the reaction product thus obtained with a base. As compared with conventionally known metal-binding agents, the present metal-binding agent can remove heavy metals more effectively from solutions or gases containing these metals even in a range of extremely low concentrations, and, hence, is useful for pollution control.

4 Claims, No Drawings

HEAVY METAL-BINDING AGENT PROCESS

This is a division of appication Ser. No. 373,419, filed 6-25-73, now abandoned.

This invention relates to a novel process for using a heavy metal-binding agent. More particularly, this invention relates to a novel process for using a heavy metal-binding agent obtained by reacting a resin containing in its molecular chain —NH—, —NH$_2$, or both thereof with carbon disulfide and, if necessary, treating the reaction product thus obtained with a base.

For removing heavy metals from a solution, such as sewage, containing them at a concentration of up to a few milligrams per liter, there had already been proposed a method in which dithizon, thionalide, 2-mercaptobenzothiazole, or the like, supported on activated carbon or silica gel is used as the heavy metal-binding agent (e.g., Japanese patent publication No. 8,281/72). Although the said heavy metal-binding agent shows a fair degree of effectiveness in binding heavy metals, it is not always satisfactory, and the fact is that advent of a more advanced heavy metal-binding agent has been hoped for.

In view of the above-said circumstances, the present invention have done extensive research to find a novel heavy metal-binding agent which has far superior metal-binding ability and, in addition, is far less expensive than conventional heavy metal-binding agents hitherto proposed.

According to this invention, there is provided a novel heavy-metal binding agent obtained by reacting a resin containing in its molecular chain —NH—, —NH$_2$, or both thereof with carbon disulfide and, if necessary, treating the reaction product thus obtained with a base, and also a process for producing said metal-binding agent.

The resins having in their molecular chains —NH—, —NH$_2$, or both thereof, which are used in this invention, include urea resins, thiourea resins, melamine resins, aniline resins, urethane resins, polyamides, polyamino condensates, and resins obtained by introducing —NH—, —NH$_2$ or both thereof into halogen-containing resins, phenolic resins, styrenic resins, and divinylbenzene resins. These resins may, of course, be copolymers of the resin components with other copolymerizable compounds such as, for example, phenols or polyamines.

The polymers especially useful in producing the heavey metal-binding agent of this invention ae aminated resins obtained by reacting a halogen-containing resin with an amino compound which, upon reaction with said resin, can introduce a primary or secondary amino group into the resulting resin.

The above-said halogen-containing resins specifically includes such halogen-containing resins as polyvinyl chloride, polyvinylidene chloride, polyvinyl bromide, polyvinilidene bromide, 1-chloro-1-bromoethylene polymer, and 1-chloro-1-fluoroethylene polymer and halogenated resins obtained by halogenating halogen-free resins such as polyethylene and polypropylene to introduce halogen, preferably chlorine, into the resins. Chlorine-containing resins such as polyvinyl chloride, polyvinylidene chloride, etc are preferably used as the halogen-containing resin in this invention. The halogen-containing resins may be copolymers of the monomers constituting the said resins with other compounds such as, for example, acrylonitrile, vinyl acetate, acrylic acid, methacrylic acid, methyl methacrylate, methyl acrylate, ethyl acrylate, and butyl acrylate.

The amino compound to be used for the reaction with the halogen-containing resin may be any amino compound which can react with the halogen-containing resin to introduce the primary or secondary amino group into the resulting resin. Examples of such amino compounds include ammonia, aliphatic mono- or polyamines, aromatic mono- or polyamines, and derivatives thereof, such as monomethylamine, monoethylamine, ethylenediamine, trimethylenediamine, tetramethylenediamine, pentamethylene-diamine, hexamethylenediamine, octamethylenediamine, nonamethylenediamine, hydrazine, triethylenetetramine, tetracthylenepentamine, aniline, o-phenylenediamine, m-phenylenediamine, p-phenylenediamine, p,p'-diaminodiphenylmethane, 2,4-diaminotoluene, nd 2,6-diaminotoluene.

The reaction of the aforesaid halogen-containing resin and the aforesaid amino compound may be carried out in the absence of a solvent or in the presence of a solvent such as water, N,N-dimethylformamdic, formamide, nitrobenzene, tetrahydrofuran, acetone, methyl alcohol, ethyl alcohol, and propyl alcohol, at a temperature of about 50° to 200° C. Other temperatures are undesirable because when the reaction temperature becomes below 50° C., the reaction between the halogen-containing resin and the amino compound becomes so slow that a long reaction time is required, while when the reaction temperature becomes above about 200° C., a side reaction of dehydrohalogenation is accelerated, resulting in a decrease in the number of halogen atoms available for amination with the amino compound.

The reaction can be carried out by keeping the reactant mixture at a temperature within the above-noted range for a period of 0.1 to 70 hours, the optimum period of time being determined within the above range according to the reaction temperature and the type of solvent, halogenated resin, and amino compound employed. A reaction period longer than 70 hours may also be used.

The ratio of the amino compound to be used to the halogen-containing resin can be 1/20 mole or more of the amino compound to one gram atom of halogen in the halogen-containing resin. However, since the use of the amino compound in an amount larger than required necessitates a recovery treatment after completion of the reaction, it is preferable to use the amino compound in a ratio of 0.1 to 6 moles per gram atom of halogen in the halogen-containing resin. If the molar ratio of the amino compound to one gram atom of halogen in the halogen-containing resin is less than 1/20, the amount of the aminated resin produced becomes undesirably small, resulting in a decrease in heavy metal-binding capacity of the product of subsequent reaction with carbon disulfide which follows amination.

The aminated resin obtained by reacting the halogen-containing resin with the amino compound is then reacted either as such or after separation and removal of the solvent and the unreacted amino compound or, if necessary, after further washing and drying, with carbon disulfide.

The heavy metal-binding agent of this invention is produced by reacting the aforesaid resin containing in its molecular chain —NH—, —NH$_2$, or both thereof with carbon disulfide.

The reaction temperature of the resin and carbon disulfide is generally 0° to 90° C., preferably the reflux temperature of carbon disulfide under ordinary pressure. The reaction can be carried out at a temperature higher than 90° C., whereas the reaction at a temperature lower than 0° C. requires undesirably a long reaction time.

Although the ratio of reactants is subject to no restriction, general practice is to use the reactants in such a ratio that about 0.01 % by weight or more, preferably about 0.1 % by weight or more, of carbon disulfide may be introduced into the resin. When the carbon disulfide introduced into the resin becomes less than about 0.01 % by weight, the heavy metal-binding efficiency will undesirably decline.

The reaction can be carried out either in the absence of a solvent or in the presence of a solvent such as water, benzene, ethers, N,N-dimethylformamide, dimethylsulfoxide, chloroform, and carbon tetrachloride. The reaction is satisfactorily carried out generally for 10 minutes to 4 hours, though a longer reaction time may be practicable.

The reaction product of carbon disulfide and the resin obtained as mentioned above is used as such or after washing and drying as a heavy metal-binding agent.

According to this invention, the reaction product obtained mentioned above can be further treated with a base to produce a heavy metal-binding agent which is more excellent in heavy metal binding ability.

The bases for use in this invention to produce the heavy metal-binding agent include, for example, hydroxides of alkali metals or alkaline earth metals such as sodium hydroxide, potassium hydroxide, and calcium hydroxide; carbonates such as sodium carbonate and potassium carbonate; bicarbonates such as sodium bicarbonate; ammonia, and amines.

The base treatment can be effected either along with the reaction in the presence of the base, or by contacting the base with the reaction product of the resin and carbon disulfide.

Although the temperature and time for the base treatment are suitably selected according to concentration of the base employed, it is usually effected at a temperature of 0° to 100° C., preferably 10° to 50° C., for a period of 10 minutes or more.

The heavy metal-binding agent thus obtained is used as such or after having been washed and dried for binding heavy metals. From the results of elementary analysis and infrared spectrophotometry, the resin of this invention is presumed to have a functional group represented by the formula,

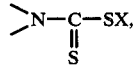

wherein X represents hydrogen atom or a salt-forming atom. The heavy metal-binding agent of this invention shows a prominent effectiveness particularly in binding such heavy metals as mercury, lead, chromium, cadmium, arsenic, copper, and iron.

In applying the heavy metal-binding agent of this invention, the amount thereof is subject to no particular restriction, but can be selected according to, for example, concentration of heavy metals in the solution or the gas to be treated, total amount of heavy metals to be removed, and the contact time. The proper amount may easily be determined by a preliminary test.

The present heavy metal-binding agent may be used in the form of either a powder or a shaped article.

By using the heavy metal-binding agent of this invention, it is possible to very effectively remove heavy metals from solutions or gases containing the same to a very low concentration of the metals. Consequently, the present heavy metal-binding agent may be effectively applicable to the removal of heavy metals from various industrial waste water and waste gases, or from the solutions and gases used in production processes.

Moreover, the heavy metal-binding agent of this invention is produced in a simple way and at low cost. Thus, the contribution of this invention to the pollution control may have a great significance.

The invention is illustrated below in further detail with reference to Examples, but the invention is not restricted to the Examples.

EXAMPLE 1

1. To 213 parts by weight of a 37 % (by weight)-aqueous solution of formaldehyde was added a 10 % (by weight)-aqueous solution of sodium hydroxide to adjust the pH to 7.5, followed by the addition of 105 parts by weight of urea. The mixture was allowed to react at about 100° C. for 2 hours. After interruption of heating, 5 parts by weight of a 20 % (by weight)-aqueous hydrochloric acid was added to the mixture with continued vigorous stirring to prepare a urea resin in the form of a white block. The resin was heated at 100° C. for 3 hours under an absolute pressure of 3 mmHg to obtain 315 parts by weight of a urea resin.

The urea resin thus obtained was then ground to a particle diameter of about 20 mesh. Into a closed vessel were charged 70 parts by weight of the ground resin and 300 parts by weight of carbon disulfide. The mixture was subjected to reaction at 40° to 44° C. for 2 hours.

The reaction product was washed with water, filtered, and dried to yield 83 parts by weight of a white resin. On elementary analysis, it was found that about 1.5 % by weight of carbon disulfide was introduced into the resin. The resin obtained is designated as heavy metal-binding agent A-1.

2. In 20 parts by weight of a 20 % (by weight)-aqueous ammonia solution was placed 10 parts by weight of the above reaction product of carbon disulfide and the urea resin, and immersion was continued for 13 hours at room temperature to effect base treatment.

The base-treated resin was washed with water, filtered, and dried to yield 10.5 parts by weight of a white resin which is designated as heavy metal-binding agent A-2.

EXAMPLE 2

1. A Mixture of 162 parts by weight of a 37 % (by weight)-aqueous formaldehyde solution, 30 parts by weight of urea, 61 parts by weight of guanidine nitrate, and 15 parts by weight of sodium carbonate was subjected to reaction at about 100° C. for 2 hours, and thereafter 40 parts by weight of water was removed by distillation. After addition of 30 parts by weight of a 20 % (by weight)-aqueous hydrochloric acid solution, the mixture was kept at 60° C. for 13 hours to obtain 149 parts by weight of a white resin. The resin was ground to a particle diameter of about 20 mesh, and 10 parts by weight of the powdered resin and 20 parts by weight of carbon disulfide were subjected to reaction at 40° to 44° C. for 2 hours. The reaction product was washed with water, and filtered to yield 13.4 parts by weight of a resin. On elementary analysis, it was found that about 3.0 % by weight of carbon disulfide had been reacted. The resin is designated as heavy metal-binding agent B-1.

2. Into 50 parts by weight of a 5 % (by weight)-aqueous sodium hydroxide solution was immersed 10 parts by weight of the above co-condensed urea resin which had been reacted with carbon disulfide, to subject it to base treatment at room temperature for 10 hours. The thus base-treated resin was washed with water, filtered, and dried to yield 10.7 parts by weight of a white resin which is designated as heavy metal-binding agent B-2.

EXAMPLE 3

To 324 parts by weight of a 37 % (by weight)-aqueous formaldehyde solution was added a 10 % (by weight)-aqueous sodium hydroxide solution to adjust the pH to 10. Then, 244 parts by weight of melamine was added to the solution and subjected to reation at 80° to 95° C. for 2 hours to prepare a melamine resin. The resulting resin was heated at 100° C. for 3 hours under an absolute pressure of 3 mmHg, to obtain 376 parts by weight of a white melamine resin. The resin was ground to a particle diameter of about 20 mesh, and 370 parts by weight of the powdered resin and 500 parts by weight of carbon disulfide were charged into a closed vessel. The mixture was subjected to reaction at 40° to 44° C. for 1 hour. To the reaction mixture was added 500 parts by weight of a 16 % (by weight)-aqueous sodium hydroxide solution, and the mixture was subjected to base treatment at 40° to 44° C for 1 hour to obtain 452 parts by weight of a yellow reaction product.

On elementary analysis, it was found that about 14 % by weight of carbon disulfide had been introduced into the resulting resin. The resin is designated as heavy metal-binding agent C.

EXAMPLE 4

To 600 parts by weight of a tetrachloroethylene solution containing 36 parts by weight of sebacic acid chloride dissolved therein, was added gradually at 25° C. 250 parts by weight of a 44 % (by weight)-aqueous solution of hexamethylene-diamine. The polymer formed at the interface was washed three times with 200 parts by weight of a 50 % (by weight)-aqueous solution of ethanol and dried in vacuo at 60° C. to obtain 75 parts by weight of a polyamide. The polyamide was ground to a particle size of about 20 mesh and allowed to react with 500 parts by weight of carbon disulfide at 43° to 44° C. for 2 hours to obtain 79 parts by weight of a resin. The elementary analysis showed that about 5 % by weight of carbon disulfide had been introduced into the resin. The resin is designated as heavy metal-binding agent D.

EXAMPLE 5

A solution of aniline hydrochloride was prepared by mixing 93 parts by weight of aniline, 110 parts by weight of concentrated hydrochloric acid, and 930 parts by weight of water. To the solution was added at room temperature 165 parts by weight of a 37 % (by weight)-aqueous formaldehyde solution and subjected to reaction for 2 hours. Then, the reaction mixture was neutralized with a 5 % (by weight)-aqueous sodium hydroxide solution, washed with water, filtered, and dried to yield 168 parts by weight of a yellow powder of an aniline resin. Thirty parts by weight of the resin and 120 parts by weight of carbon disulfide were charged into a closed vessel and subjected to reaction at 40° to 44° C. for 1 hour to yield 33.7 parts by weight of a resin. The elementary analysis showed that about 12 % by weight of carbon disulfide had been introduced into the resin. The resin is designated as heavy metal-binding agent E.

EXAMPLE 6

In 80 parts by weight of methanol was dissolved 100 parts by weight of hydrazine hydrate. To the resulting solution was added dropwise a solution of 57 parts by weight of dimethyl sebacate in 20 parts by weight of methanol, while heating the solution at 63° to 65° C. and refluxing gently. After completion of the dropwise addition, the solution was refluxed for 2 hours. Thereafter, the resulting reaction mixture was cooled to 15° C., and to the cooled mixture was added 100 parts by weight of water. The precipitated solids were collected by filtration, washed with water, recrystallized from aqueous methanol, and dried to obtain 50 parts by weight of sebacid acid dihydrazide. Then, 20 parts by weight of the thus obtained sebacic acid dihydrazide and 5 parts by weight of hydrazine hydrate were charged into a pressure vessel and subjected to reaction by heating at 260° C. for 5 hours, to prepare 3,5-octamethylene-4-amino-1,2,4-triazole resin. In the presence of 4 parts by weight of a 20 % (by weight)-aqueous sodium hydroxide solution and 10 parts by weight of carbon disulfide, the above-noted resin was kept at 47° to 51° C. for 30 minutes to allow the reaction to proceed, thereby yielding 23 parts by weight of a resin. On elementary analysis, it was found that about 10 % by weight of carbon disulfide had been introduced into the resin. The resin is designated as heavy metal-binding agent F.

EXAMPLE 7

The pH value of 110 parts by weight of a 37 % (by weight)-aqueous formaldehyde solution was adjusted to 8.0 with a 10 % (by weight)-aqueous sodium hydroxide solution. The resulting solution was mixed with 76 parts by weight of thiourea and stirred at 80° to 90° C. for 2 hours. The, 40 parts by weight of water was removed by distillation under reduced pressure by means of a water suction pump. The reaction mixture was admixed with 30 parts by weight of a 20 % (by weight)-aqueous soluton of hydrochloric acid and heated at 100° C. for 1 hour under reduced pressure to obtain 135 parts by weight of a thiourea resin. The resin was then ground to a particle size of about 20 mesh, admixed with 300 parts by weight of carbon disulfide and 20 parts by weight of a 20 % (by weight)-aqueous sodium hydroxide solution, and subjected to reaction at 44° to 45° C. for 2 hours to obtain 138 parts by weight of a resin. About 1.8 % by weight of carbon disulfide was contained in the resin. The resin is designated as heavy metal-binding agent G.

EXAMPLE 8

In the presence of 15 parts by weight of sodium carbonate, a mixture of 63 parts by weight of melamine, 61 parts by weight of guanidine nitrate and 81 parts by weight of a 37 % (by weight)-aqueous solution of formaldehyde was stirred at 90° to 95° C. for 2 hours and then 40 parts by weight of water was removed by distillation. To the mixture was added 30 parts by weight of a 20 % (by weight)-aqueous solution of hydrochloric acid and cooled to obtain 125 parts by weight of a resin. The resin was ground to a particle size of about 20 mesh. Ten parts by weight of the powdered resin was heated in a mixture of 20 parts by weight of carbon disulfide and 20 parts by weight of a 20 % (by weight)-aqueous solution of potassium hydroxid at 43° to 45° C. for 1 hour to subject them to reaction, thereby obtaining 12 parts by weight of a yellow resin. On elementary analysis, it was found that about 11 % by weight of carbon disulfide had been introduced into the resin. The resin is designated as heavy metal-binding agent H.

EXAMPLE 9

To 10 samples each 100 parts by weight of an aqueous solution containing 10 mg/liter of mercury, were added respectively 0.5 parts by weight of the 10 heavy metal-binding agents prepared in the foregoing Examples. Each mixture was shaken for 1 hour to ensure through contact. The concentration of mercury in each solution after the treatment was as shown in Table 1.

Table 1

| Heavy metal-binding agent | Concentration of mercury in solution (mg/liter) | |
|---|---|---|
| | Before treatment | After treatment |
| A – 1 | 10 | 1.21 |
| A – 2 | 10 | 0.01 |
| B – 1 | 10 | 0.92 |
| B – 2 | 10 | 0.22 |
| C | 10 | 0.42 |
| D | 10 | 1.20 |
| E | 10 | 0.97 |
| F | 10 | 0.08 |
| G | 10 | 0.02 |
| H | 10 | 0.08 |

COMPARATIVE EXAMPLE 1

To two samples each 100 parts by weight of an aqueous solution containing 10 mg/liter of mercury were respectively added 0.5 parts by weight of a commercially available chelating resin for mercury adsorption and the urea resin before reacting with carbon disulfide in Example 1 (referred to hereinafter as only "the urea resin"). Each mixture was shaken for one hour to ensure thorough contact. The concentration of mercury in each solution after the treatment was as shown in Table 2.

Table 2

| Heavy metal-binding agent | Concentration of mercury in solution (mg/liter) | |
|---|---|---|
| | Before treatment | After treatment |
| Commercially available chelating resin for mercury adsorption | 10 | 1.25 |
| The urea resin | 10 | 7.41 |

From the results in Example 9 and Comparative Example 1, it it evident that the heavy metal-binding agent according to this invention is equal or far superior in mercury-binding ability to the commercially available chelating resin for mercury adsorption and that the urea resin has substantially no mercury-binding ability.

EXAMPLE 10

To three samples each 100 parts by weight of an aqueous solution containing cadmium in a concentration of 10 mg/liter were respectively added 0.5 part by weight of heavy metal-binding agents B-2, C, and H. Each mixture was shaken for 1 hour to ensure thorough contact. The concentration of cadmium in each solution was as shown in Table 3.

Table 3

| Heavy metal-binding agent | Concentration of cadmium in solution (mg/liter) | |
|---|---|---|
| | Before treatment | After treatment |
| B – 2 | 10 | 3.9 |
| C | 10 | <0.1 |
| H | 10 | <0.1 |
| Comparative Example 2 The urea resin | 10 | 9.1 |

EXAMPLE 11

To three samples each 100 parts by weight of an aqueous solution containing lead in a concentration of 10 mg/liter, were respectively added 0.5 part by weight of heavy metal-binding agents B-2, C, and H. Each mixture was shaken for 1 hour to ensure thorough contact. The concentration of lead in each solution was as shown in Table 4.

Table 4

| Heavy metal-binding agent | Concentration of lead in solution (mg/liter) | |
|---|---|---|
| | Before treatment | After treatment |
| B – 2 | 10 | 4.1 |
| C | 10 | 0.8 |
| H | 10 | <0.1 |
| Comparative Example 3 The urea resin | 10 | 9.0 |

EXAMPLE 12

To three samples each 100 parts by weight of an aqueous solution containing chromium (hexa-valent) in a concentration of 10 mg/liter were respectively added 0.5 part by weight of heavy metal-binding agents A-2, B-2, and H. Each mixture was shaken for 1 hour to ensure thorough contact. The concentration of chromium in each solution after the treatment was as shown in Table 5.

Table 5

| Heavy metal-binding agent | Concentration of chromium in solution (mg/liter) | |
|---|---|---|
| | Before treatment | After treatment |
| A – 2 | 10 | 1.64 |
| B – 2 | 10 | 0.22 |
| H | 10 | <0.1 |
| Comparative Example 4 The urea resin | 10 | 8.5 |

EXAMPLE 13

1. To 70 parts by weight of a vinyl chloride resin (emulsion polymer) of 20 to 60 mesh in particle diameter were added 202 parts by weight of ethylenediamine and 50 parts by weight of water. The mixture was subjected to reaction at 80° to 120° C. for 3 hours. The reaction mixture was filtered, washed with water, and dried to obtain 55 parts by weight of a yellowish brown, aminated vinyl chloride resin having a particle diameter of 20 to 60 mesh.

Then, 50 parts by weight of the aminated vinyl chloride resin and 100 parts by weight of carbon disulfide were subjected to reaction at 41° to 44° C. for 2 hours.

The reaction mixture was filtered, washed with water, and dried to yield 65.3 parts by weight of a yellowish brown resin. On elementary analysis and determination of dithiocarbamic acid group, it was found that 24.5 % by weight of carbon disulfide had been introduced into the resin. The resin is designated as heavy metal-binding agent I-1.

2. A mixture of 20 parts by weight of heavy metal-binding agent I-1 and 50 parts by weight of a 10 % (by weight)-aqueous sodium hydroxide solution was heat-treated at 35° to 40° C, for 5 minutes, then filtered, washed with water, and dried to obtain 21.2 parts by weight of a yellowish brown resin. The resin is designated as heavy metal-binding agent I-2.

EXAMPLE 14

To 62 parts by weight of a vinyl chloride resin (suspension polymer) of 20 to 30 mesh in particle diameter was added 114 parts by weight of hydrazine hydrate. After the mixture had been subjected to reaction at 111° to 114° C. for 2 hours, the unreacted hydrazine hydrate was removed by filtration. To the resulting ochre granular reaction product were added 60 parts by weight of carbon disulfide and 50 parts by weight of a 10 % (by weight)-aqueous potassium hydroxide solution. The mixture was subjected to reaction at 42° to 44.5° C. for 3 hours. The reaction product was filtered, washed with water, and dried to yield 68.1 parts by weight of an ochre resin of 20 to 40 mesh in particle diameter. On elementary analysis and determination of the dithiocarbamic acid group, it was found that 6.4 % by weight of carbon disulfide had been introduced into the resin. The resin is designated as heavy metal-binding agent J.

EXAMPLE 15

Three hundred parts by weight of triethylene-tetramine was added to 159 parts by weight of an EVA (ethylene-vinyl acetate copolymer)-vinyl chloride-graft polymer of 12 to 16 mesh in particle diameter, having an EVA/vinyl chloride weight ratio of 55/45 which was prepared by grafting vinyl chloride on the EVA having an ethylene/vinyl acetate weight ratio of 55/45. After 18 hours of reaction at 80° to 90° C., the reaction product was filtered and washed with water to obtain 287 parts by weight (wet) of a black resin. A mixture of 162 parts by weight of the resin thus obtained and 478 parts by weight of carbon disulfide were subjected to reaction at 43° to 44° C. for 2 hours, then admixed with 100 ml of a 10 %-aqueous sodium hydroxide solution, and further subjected to reaction at 43° to 44° C. for 15 minutes. The reaction product was filtered and washed with water to obtain 216 parts by weight (wet) of a brownish black resin of 8 to 16 mesh in particle diameter. On elementary analysis and determination of the dithiocarbamic acid group, it was found that 18.8 % by weight of carbon disulfide had been introduced into the resin. The resin, ground to a particle size smaller than 50 mesh, is designated as heavy metal-binding agent K.

EXAMPLE 16

A polypropylene, which had been ground to a particle size smaller than 100 mesh, was chlorinated to obtain a powder of chlorinated polypropylene containing 48 % by weight of chlorine in the resin. To 60 parts by weight of the resin was added 300 parts by weight of aniline. After 3 hours of reaction at 83° to 91° C., the temperature was elevated and the reaction was effected at 145° to 150° C. for 1 hour. The unreacted aniline was removed by decantation and the reaction product was admixed with 150 parts by weight of carbon disulfide. The reaction was allowed to proceed at 41° to 43° C. for 2 hours. The reaction produce was filtered, washed with water, and dried to obtain 73 parts by weight of a brownish black resin. On elementary analysis and determination of the dithiocarbamic acid group, it was found that 6.7 % by weight of carbon disulfide has been introduced into the resin. The resin is designated as heavy metal-binding agent L.

EXAMPLE 17

1. A polyethylene, which had been ground to a particle size smaller than 100 mesh, was chlorinated to obtain a fine powder of chlorinated polyethylene containing 37 % by weight of chlorine in the resin. To 80 parts by weight of the resin was added 200 parts by weight of m-phenylenediamine. After 9 hours of reaction at 115° to 143° C., the reaction product was filtered, washed with water, and dried to obtain 91 parts by weight of a brown resin.

Then, a mixture of 85 parts by weight of the resin obtained above and 250 parts by weight of carbon disulfide was subjected to reaction at 43° to 44° C. for 3 hours. The reaction product was filtered, washed with water, and dried to obtain 92 parts by weight of a brown resin. One elementary analysis and determination of the dithiocarbamic acid group, it was found that 8 % by weight of carbon disulfide had been introduced into the resin. The resin is designated as heavy metal-binding agent M-1.

2. After treating 10 parts by weight of heavy metal-binding agent M-1 with 50 parts by weight of a 10 % (by weight)-aqueous ammonia solution at 20° to 25° C. for 12 hours, the base-treated reason was filtered, washed with water, and dried to obtain 10.3 parts by weight of a brown resin. This resin is designated as heavy metal-binding agent M-2.

EXAMPLE 18

To seven samples each 100 parts by weight of an aqueous solution containing mercury in a concentration of 10 mg/liter were respectively added 0.5 part by weight of the seven heavy metal-binding agents prepared in Examples 13 to 17. Each mixture was shaken for 1 hour to ensure thorough contact. The concentration of mercury in each solution after the treatment was as shown in Table 6.

Table 6

| Heavy metal-binding agent | Concentration of mercury in aqueous solution after treatment (mg/liter) |
|---|---|
| I - 1 | 0.097 |
| I - 2 | 0.006 |
| J | 0.137 |
| K | 0.02 |
| L | 0.087 |
| M - 1 | 0.094 |
| M - 2 | 0.083 |

COMPARATIVE EXAMPLE 5

To three samples each 100 parts by weight of an aqueous solution containing mercury in a concentration of 10 mg/liter were respectively added 0.5 part by weight of commercially available chelating resin for mercury adsorption of 24 to 30 mesh in particle diameter, a commercially available active carbon, and the same vinyl chloride resin (without having been treated) as used for the reaction in Example 13-(1). Each mixture was shaken for 1 hour to ensure thorough contact. After the treatment, the concentration of mercury in the aqueous solution was as shown in Table 7.

Table 7

| Heavy metal-binding agent | Concentration of mercury in aqueous solution after treatment (mg/liter) |
| --- | --- |
| Commercially available chelating resin for mercury adsorption (24 to 30 mesh) | 1.25 |
| Commercially available active carbon (<100 mesh) | 1.092 |
| Vinyl chloride resin (20 to 60 mesh) | 9.752 |

From the results in Example 18 and Comparative Example 5, it is evident that the heavy metal-binding agent according to this invention is far superior in mercury-binding ability to the commercially available chelating resin for mercury adsorption and that vinyl chloride resin as such has substantially no mercury-binding ability.

EXAMPLE 19

To 100 parts by weight of an aqueous solution containing cadmium in a concentration of 10 mg/liter, was added 0.5 part by weight of heavy metal-binding agent I-2 or J. The mixture was shaken for 1 hour to ensure thorough contact. After the treatment, the concentration of cadmium in the aqueous solution as as shown in Table 8.

Table 8

| Heavy metal-binding agent | Concentration of cadmium in aqueous solution after treatment (mg/liter) |
| --- | --- |
| I - 2 | 0.6 |
| J | 1.3 |

EXAMPLE 20

To 100 parts by weight of an aqueous solution containing lead in a concentration of 10 mg/liter was added 0.5 part by weight of heavy metal-binding agent I-2, J, or K. Each mixture was shaken for 1 hour to ensure thorough contact. After the treatment, the concentration of lead in the aqueous solution was as shown in Table 9.

Table 9

| Heavy metal-binding agent | Cocentration of lead in aqueous solution after treatment (mg/liter) |
| --- | --- |
| I - 2 | 0.29 |
| J | 1.02 |
| K | 1.78 |

What is claimed is:

1. A method for removing heavy metals present in a solution or gas comprising contacting the heavy metal-containing solution or gas with a heavy metal-binding agent consisting essentially of the reaction product of at least 0.01% by weight of carbon disulfide with a resin selected from the group consisting of a urea resin, a thiourea resin, a melamine resin, an aniline resin, a urethane resin, and a resin obtained by reacting an amino compound with a halogen containing resin selected from the group consisting of polyvinyl chloride, polyvinylidene chloride, polyvinyl bromide, polyvinylidene bromide, 1-chloro-1-bromoethylene polymer, 1-chloro-1-fluoroethylene polymer, chlorinated polyethylene, chlorinated polypropylene and a copolymer of vinyl chloride, vinylidene chloride, vinyl bromide, vinylidene bromide, 1-chloro-1-bromoethylene or 1-chloro-1-fluoroethylene with acrylonitrile, vinyl acetate, acrylic acid, methacrylic acid, methyl methacrylate, methyl acrylate, ethyl acrylate or butyl acrylate.

2. A method according to claim 1, wherein the reaction product is further reacted with a base.

3. A method according to claim 1, wherein the heavy metal is selected from the group consisting of mercury, lead, chromium, cadmium, arsenic, copper and iron.

4. A method according to claim 1, wherein the heavy metal-binding agent is in the form of a powder or shaped article.

* * * * *